United States Patent
Toda

(10) Patent No.: US 9,061,418 B2
(45) Date of Patent: Jun. 23, 2015

(54) CONTROL SYSTEM EQUIPPED WITH DETACHABLE CONTROL PANEL

(71) Applicant: FANUC CORPORATION, Minamitsuru-gun, Yamanashi (JP)

(72) Inventor: Shuntaro Toda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/190,636

(22) Filed: Feb. 26, 2014

(65) Prior Publication Data

US 2014/0244034 A1 Aug. 28, 2014

(30) Foreign Application Priority Data

Feb. 28, 2013 (JP) .................................. 2013-038779

(51) Int. Cl.
- *G06F 19/00* (2011.01)
- *B25J 9/16* (2006.01)
- *G05B 19/409* (2006.01)

(52) U.S. Cl.
CPC ............... *B25J 9/161* (2013.01); *G05B 19/409* (2013.01); *G05B 2219/36159* (2013.01)

(58) Field of Classification Search
USPC ............ 700/245, 264, 250; 307/38, 134, 139, 307/11, 116, 125; 363/50; 318/565, 567, 318/563; 901/3
See application file for complete search history.

(56) References Cited

U.S. PATENT DOCUMENTS

| | | | |
|---|---|---|---|
| 5,154,717 A * | 10/1992 | Matsen et al. .................. | 606/53 |
| 5,444,342 A | 8/1995 | Matsuo et al. | |
| 5,751,918 A * | 5/1998 | Shimogama et al. ......... | 700/264 |
| 6,222,338 B1 * | 4/2001 | Villaret ..................... | 318/568.13 |
| 6,288,352 B1 * | 9/2001 | Fukui et al. .................... | 200/435 |
| 2003/0018411 A1 * | 1/2003 | Suita et al. ..................... | 700/245 |
| 2003/0184164 A1 * | 10/2003 | Fukui et al. ................... | 307/326 |
| 2004/0078116 A1 * | 4/2004 | Hashimoto et al. ........... | 700/264 |
| 2005/0166413 A1 * | 8/2005 | Crampton ....................... | 33/503 |
| 2005/0209734 A1 * | 9/2005 | Tanaka et al. ................ | 700/245 |
| 2006/0202556 A1 * | 9/2006 | Tanaka et al. ................... | 307/11 |
| 2007/0297890 A1 * | 12/2007 | Sjoberg et al. ................ | 414/735 |
| 2010/0106299 A1 * | 4/2010 | Nagata .......................... | 700/264 |
| 2013/0287286 A1 * | 10/2013 | Zingaretti et al. ............. | 382/141 |

FOREIGN PATENT DOCUMENTS

| | | |
|---|---|---|
| JP | 4-98594 | 8/1992 |
| JP | 5-42493 | 2/1993 |

* cited by examiner

*Primary Examiner* — Ronnie Mancho
(74) *Attorney, Agent, or Firm* — RatnerPrestia

(57) ABSTRACT

A control system (100) comprises a control apparatus (2) for controlling a driven body, and a pendant (1) having an emergency stop switch (11), wherein the control apparatus (2) includes an emergency stop circuit (21) which causes the operation of the driven body to stop when the emergency stop switch (11) is operated, a detach-ready setting switch (23) which switches detach-ready setting information to "detach mode" when connecting or disconnecting the pendant (1) to or from the control apparatus (2) and otherwise to "normal mode", and a connection state monitoring unit (24) which sends information concerning the connection state of the pendant (1) to the emergency stop circuit (21), and wherein the control apparatus (2) disables the operation of the emergency stop circuit (21) when the detach-ready setting information is set to "detach mode" and when the pendant (1) is disconnected from the control apparatus (2).

12 Claims, 13 Drawing Sheets

CONTROL SYSTEM EQUIPPED WITH DETACHABLE CONTROL PANEL

CROSS-REFERENCE TO RELATED APPLICATIONS

This application is a new U.S. patent application that claims benefit of JP 2013-038779, filed on Feb. 28, 2013, the content of JP 2013-038779 is incorporated herein by reference.

FIELD OF THE INVENTION

The present invention relates to a control system equipped with a detachable pendant, and more specifically to a control system equipped with a pendant having an emergency stop switch.

BACKGROUND OF THE INVENTION

A pendant is connected to a control apparatus that controls a robot or a machine, and is used to control the robot or the like. A pendant is known that is designed to be detachable so that it can be connected to any one of a plurality of control apparatus' and so that it can be connected to or disconnected from a control apparatus as needed. In many cases, when disconnecting the pendant, the disconnection has had to be made after turning off power to the control apparatus or after putting the control apparatus in an emergency stop condition, thus taking time and labor to accomplish the task. A similar problem arises when connecting the pendant to a control apparatus.

To solve the above problem, it is known in the prior art to provide a control apparatus equipped with a "detaching" switch (for example, refer to Japanese Unexamined Patent Publication No. H5-42493). The configuration of this prior art control apparatus is shown in FIG. 1. A robot 1002 is connected to robot control apparatus 1001 equipped with an emergency stop circuit, and a first port 1003 and a second port 1004 are connected to it. The first port 1003 and the second port 1004 are identical in configuration; the first port 1003 is provided near or within the robot control apparatus 1001, while the second port 1004 is located near the robot 1002. The first port 1003 is equipped with a detaching switch SW5 and a plurality of connectors, and the second port 1004 is equipped with a detaching switch SW6 and a plurality of connectors. A pendant 1005 has a structure that is detachably connectable to the first port 1003 or a second port 1004.

In the prior art control apparatus, provisions are made so as not to activate the emergency stop function of the robot 1002 when the pendant 1005 is detached from the robot control apparatus 1001 while the detaching switch SW5 or SW6 is ON. Thus, it is claimed that the pendant 1005 can be safely detached from the robot control apparatus 1001 without causing the operation of the robot 1002 to stop.

In the prior art control apparatus, the emergency stop switch on the pendant is disabled by just operating the detaching switch. However, a situation can occur where even when power is ON to the control apparatus, the emergency stop switch on the pendant connected to the control apparatus is disabled and thus may not be operated when necessary.

SUMMARY OF THE INVENTION

According to an embodiment of the present invention, there is provided a control system comprising a control apparatus for controlling a driven body, and a pendant having an emergency stop switch for causing operation of the driven body to stop, wherein the control apparatus includes: an emergency stop circuit which causes operation of the driven body to stop when the emergency stop switch is operated or when the pendant is disconnected from the control apparatus; a detach-ready setting switch which switches detach-ready setting information to "detach mode" or "normal mode", the detach-ready setting information being switched to "detach mode" when connecting or disconnecting the pendant to or from the control apparatus and otherwise switched to "normal mode"; and a connection state monitoring unit which monitors connection state between the pendant and the control apparatus and sends connection state information to the emergency stop circuit, and wherein the control apparatus disables operation of the emergency stop circuit when the detach-ready setting information is set to "detach mode" and when the connection state information indicates that the pendant has been disconnected from the control apparatus.

According to the control system equipped with the detachable pendant of the present invention, the pendant can be safely connected to or disconnected from the control apparatus.

DESCRIPTION OF THE DRAWINGS

These and other features and advantages of the present invention will be better understood based on the following detailed description, taken together with the drawings wherein.

DETAILED DESCRIPTION OF THE PREFERRED EMBODIMENT

A control system equipped with a detachable pendant according to the present invention will be described below with reference to the drawings. It will, however, be noted that the technical scope of the present invention is not limited by any particular embodiment described herein but extends to the inventions described in the appended claims and their equivalents.

First Embodiment

Figure 1:
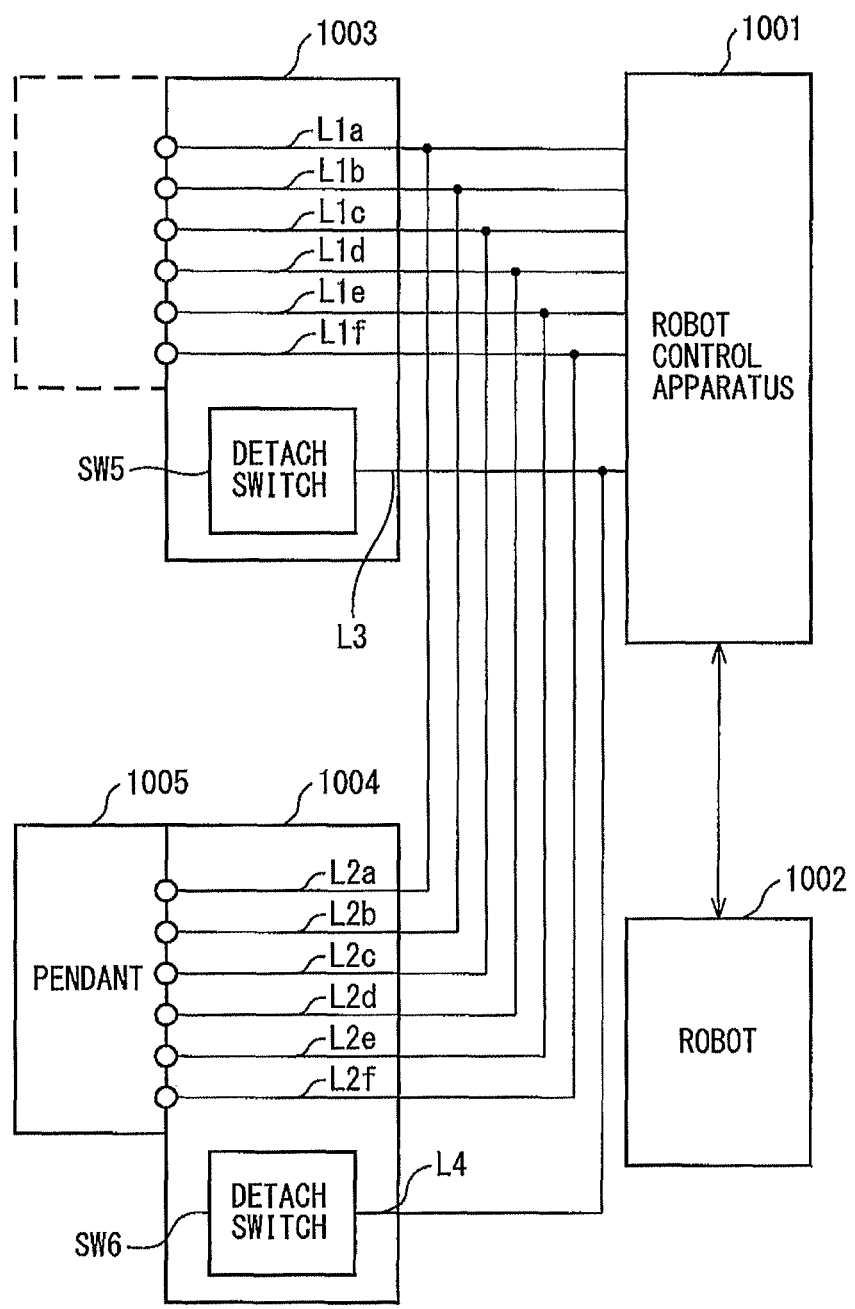
FIG. 1 is a diagram showing the configuration of a control apparatus according to the prior art.
Figure 2:
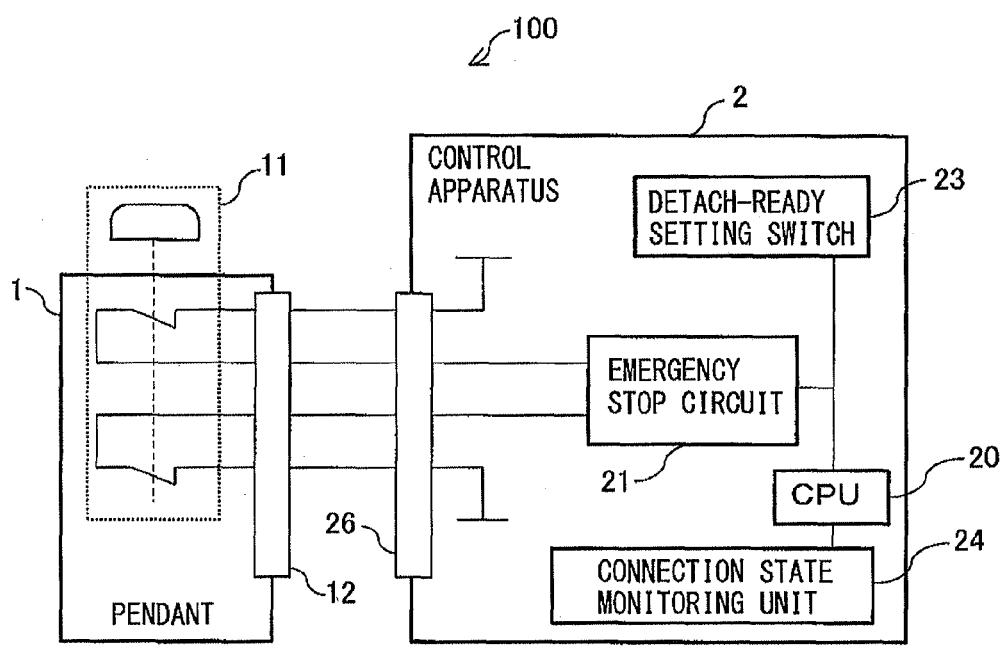
FIG. 2 is a diagram showing the configuration of a control system according to a first embodiment of the present invention.

A control system according to a first embodiment of the present invention will be described. FIG. 2 is a diagram showing the configuration of the control system 100 according to the first embodiment of the present invention. The control system 100 according to the first embodiment of the present invention comprises a control apparatus 2 for controlling a driven body (not shown) such as a robot or a machine, and a pendant 1 having an emergency stop switch 11 for causing the operation of the driven body to stop.

The control apparatus 2 includes an emergency stop circuit 21 which causes the operation of the driven body to stop when the emergency stop switch 11 is operated or when the pendant 1 is disconnected from the control apparatus 2, a detach-ready setting switch 23 which switches detach-ready setting information to "detach mode" or "normal mode", the detach-ready setting information being switched to "detach mode" when connecting or disconnecting the pendant 1 to or from the control apparatus 2 and otherwise switched to "normal mode", and a connection state monitoring unit 24 which monitors the connection state between the pendant 1 and the control apparatus 2 and sends connection state information to the emergency stop circuit 21. The control apparatus 2 disables the operation of the emergency stop circuit 21 when the detach-ready setting information is set to "detach mode" and when the connection state information indicates that the pendant 1 has been disconnected from the control apparatus 2.

The meaning of the detach-ready setting information being set to "detach mode" or "normal mode" will be described below. When set to "detach mode", the detach-ready setting information indicates that the detaching action, i.e., the action to connect or disconnect the pendant 1 to or from the control apparatus 2, is executed. On the other hand, when set to "normal mode", the detach-ready setting information indicates that the detaching action, i.e., the action to connect or disconnect the pendant 1 to or from the control apparatus 2, is not executed or the action once executed is aborted.

The pendant 1 is designed to be detachably connectable to the control apparatus 2, and when connecting the pendant 1 to the control apparatus 2, a port 12 on the pendant side is connected to a port 26 on the control apparatus side.

When the emergency stop switch 11 on the pendant 1 is depressed, an emergency stop signal is sent to the emergency stop circuit 21 which can thus cause the operation of the driven body to stop. As shown in FIG. 2, the emergency stop circuit 21 is connected to the emergency stop switch 11 via duplicate paths. However, the connection is not limited to this particular configuration, but may be implemented by a single path or triplicate paths. The emergency stop circuit 21 can also cause the operation of the driven body to stop when the pendant 1 is disconnected from the control apparatus 2.

The detach-ready setting information, which is set to "detach mode" when connecting or disconnecting the pendant 1 to the control apparatus 2 and otherwise set to "normal mode", is switched to "detach mode" or "normal mode" under the control of the detach-ready setting switch 23. When getting ready for the detaching action, i.e., when connecting the pendant 1 to the control apparatus 2 or when disconnecting the once connected pendant 1 from the control apparatus 2, the detach-ready setting switch 23 is operated to switch the detach-ready setting information to "detach mode". It is also used to switch the detach-ready setting information back to "normal mode" when the pendant was not connected or was not disconnected after setting the detach-ready setting information to "detach mode".

The detach-ready setting switch 23 can be operated from outside the control apparatus 2. More specifically, the detach-ready setting switch 23 can be operated to switch the detach-ready setting information by operating a key on the pendant 1 or by operating a touch panel, a setup screen, or a switch located on or near the control apparatus 2.

The connection state monitoring unit 24 monitors the connection state between the pendant 1 and the control apparatus 2 and sends the connection state information to the emergency stop circuit 21. In the example of FIG. 2, the connection state monitoring unit 24 is shown as sending the connection state information to the emergency stop circuit 21 via a CPU 20. However, the connection state information may be sent from the connection state monitoring unit 24 directly to the emergency stop circuit 21. Further, by accepting the connection state information, the CPU 20 may mask the received emergency stop signal by software and thus ignore the emergency stop signal that has been input to the CPU 20.

When the detach-ready setting information is set to "detach mode", and when the connection state information indicates that the pendant 1 has been disconnected from the control apparatus 2, the control apparatus 2 "disables" the operation of the emergency stop circuit 21. More specifically, based on the detach-ready setting information and on the connection state information from the connection state monitoring unit 24, the CPU 20 contained in the control apparatus 2 controls the operation of the emergency stop circuit 21 or applies a software mask to the signal that has been input from the emergency stop circuit 21 to the CPU 20.

With the above arrangement, the pendant 1 can be safely disconnected from the control apparatus 2, with the power turned on to the control apparatus 2 and with the emergency stop circuit 21 held in the "disabled" state (disarmed state). Further, since the emergency stop switch 11 on the pendant 1 remains "enabled" until the pendant 1 is disconnected, the operation of the driven body can be stopped in an emergency by depressing the emergency stop switch 11, which serves to avoid a situation where the emergency stop switch 11 is "disabled" and is unable to stop the operation of the driven body.

Figure 3:
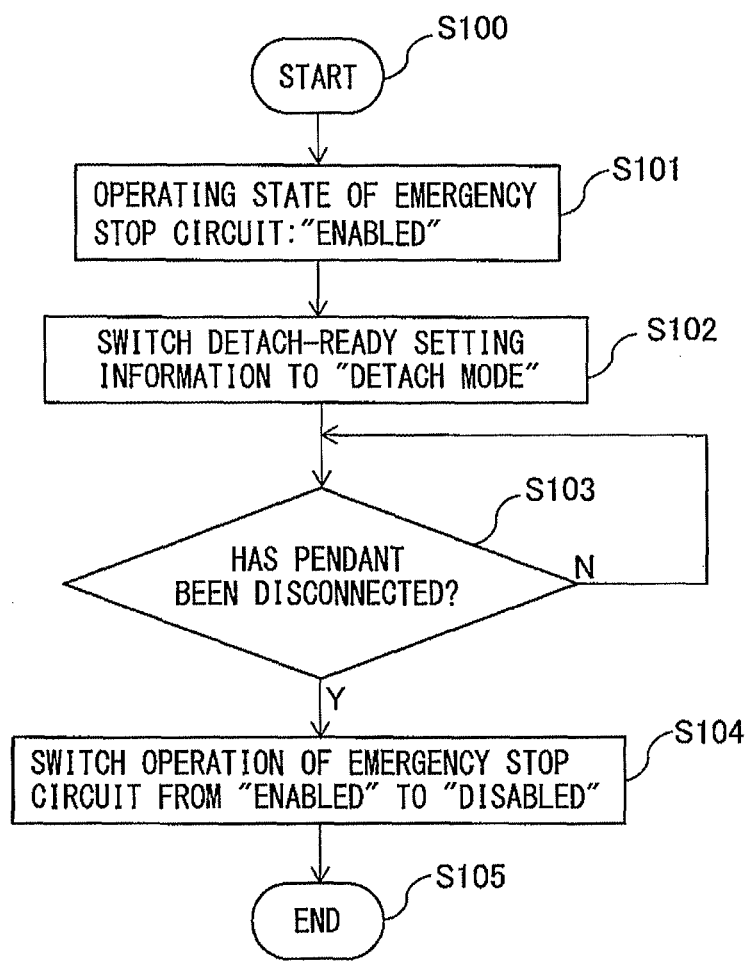
FIG. 3 is a flowchart illustrating the operating procedure of the control apparatus according to the first embodiment of the present invention.

Next, the operating procedure of the control apparatus according to the first embodiment of the present invention will be described with reference to the flowchart of FIG. 3. First, in step S101, the pendant 1 is connected to the control apparatus 2, and the control apparatus 2 is operated in a normal operating condition. At this time, the operation of the emergency stop switch 11 is "enabled". That is, the operation of the driven body (not shown) under control of the control apparatus 2 can be stopped by depressing the emergency stop switch 11. At this time, since the pendant 1 is operating normally and is not set ready for the detaching action, the detach-ready setting switch 23 selects "normal mode" as the detach-ready setting information.

Next, in step S102, the detach-ready setting switch 23 is set to select "detach mode" as the detach-ready setting information in order to set the pendant 1 ready to be disconnected from the control apparatus 2.

In step S103, the connection state monitoring unit 24 monitoring the connection state between the pendant 1 and the control apparatus 2 determines whether or not the pendant 1 has been disconnected from the control apparatus 2. If the pendant 1 remains connected to the control apparatus 2, the process returns to step S103 to continue monitoring the connection state. On the other hand, if it is determined that the pendant 1 has been disconnected from the control apparatus 2, then in step S104 the operation of the emergency stop circuit 21 is switched from "enabled" to "disabled".

As described above, in the control system 100 according to the first embodiment of the present invention, when the detach-ready setting information is set to "detach mode", and when the connection state information indicates that the pendant 1 has been disconnected from the control apparatus 2, the control apparatus 2 switches the operation of the emergency stop circuit 21 from "enabled" to "disabled". Accordingly, the operation of the driven body can be stopped by using the emergency stop switch 11 anytime until the moment immediately before the pendant 1 is disconnected from the control apparatus 2, and thus the pendant 1 can be disconnected from the control apparatus 2 without compromising safety.

While the above description is the case where the detach-ready setting switch 23 is operated to switch the detach-ready setting information from "normal mode" to "detach mode", it is also possible to switch the detach-ready setting information from "detach mode" to "normal mode". Then, after the detach-ready setting information has been switched from "normal mode" to "detach mode" by operating the detach-ready setting switch 23, if the action to disconnect the pendant 1 from the control apparatus 2 is aborted in the process of disconnecting the pendant 1, for example, the detach-ready setting information can be switched back to "normal mode". Further, provisions may be made so that the detach-ready setting information is switched alternately between "detach mode" and "normal mode" each time the detach-ready setting switch 23 is operated.

Second Embodiment

Figure 4:
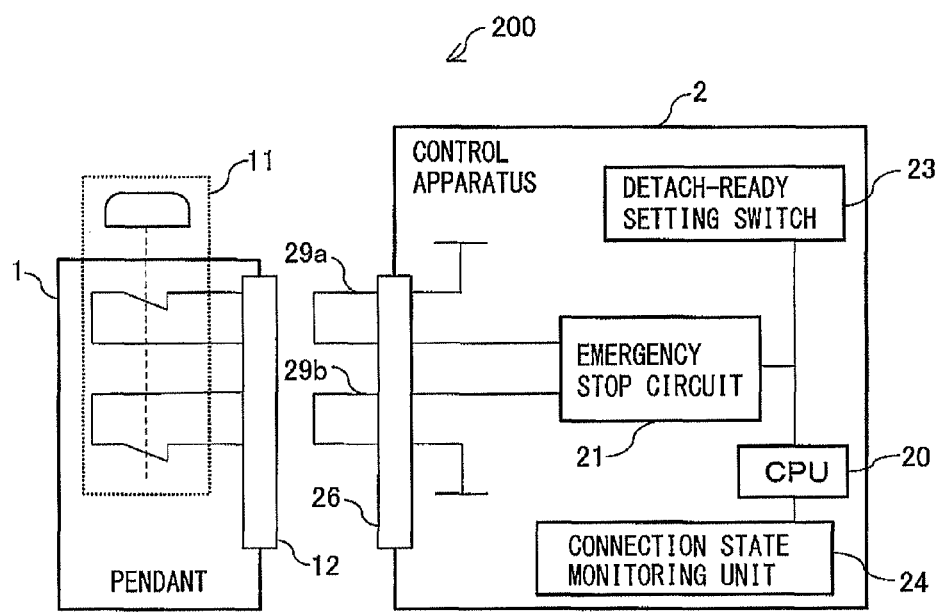
FIG. 4 is a diagram showing the configuration of a control system according to a second embodiment of the present invention.

Next, a control system according to a second embodiment of the present invention will be described. FIG. 4 is a diagram showing the configuration of the control system according to the second embodiment. The control system 200 of the second embodiment differs from the control system 100 of the first embodiment in that the control system 200 further includes shorting connectors 29a and 29b which are detachable with respect to the control apparatus 2 and which short-circuit and "disable" the emergency stop circuit 21, and in that after the detach-ready setting information has been set to "detach mode" by the detach-ready setting switch 23, if it is detected by the connection state monitoring unit 24 that the pendant 1 has been disconnected, the control apparatus 2 switches the operation of the emergency stop circuit 21 from "enabled" to "disabled" for a preset first time period, and connects the shorting connectors 29a and 29b to the emergency stop circuit 21, and when the first time period has elapsed, the detach-ready setting information is automatically switched from "detach mode" to "normal mode" and, at the same time, the operation of the emergency stop circuit 21 switches to "enabled". Otherwise, the configuration is the same as that of the control system 100 of the first embodiment, and therefore, a detailed description will not be given.

The shorting connectors 29a and 29b can be connected to the control apparatus side port 26 with the pendant 1 disconnected, and can limit the operation of the emergency stop circuit 21. In the example shown in FIG. 4, the terminals are connected together by the externally provided shorting connectors 29a and 29b. However, the configuration is not limited to this particular example. Alternatively, the terminals on the control apparatus side port 26 may be short-circuited by a switch, etc. incorporated in the control apparatus 2. In the present embodiment, two shorting connectors are provided because the emergency stop circuit 21 is duplicated. However, the number of shorting connectors may be changed to match the number of emergency stop circuits 21.

Figure 5:
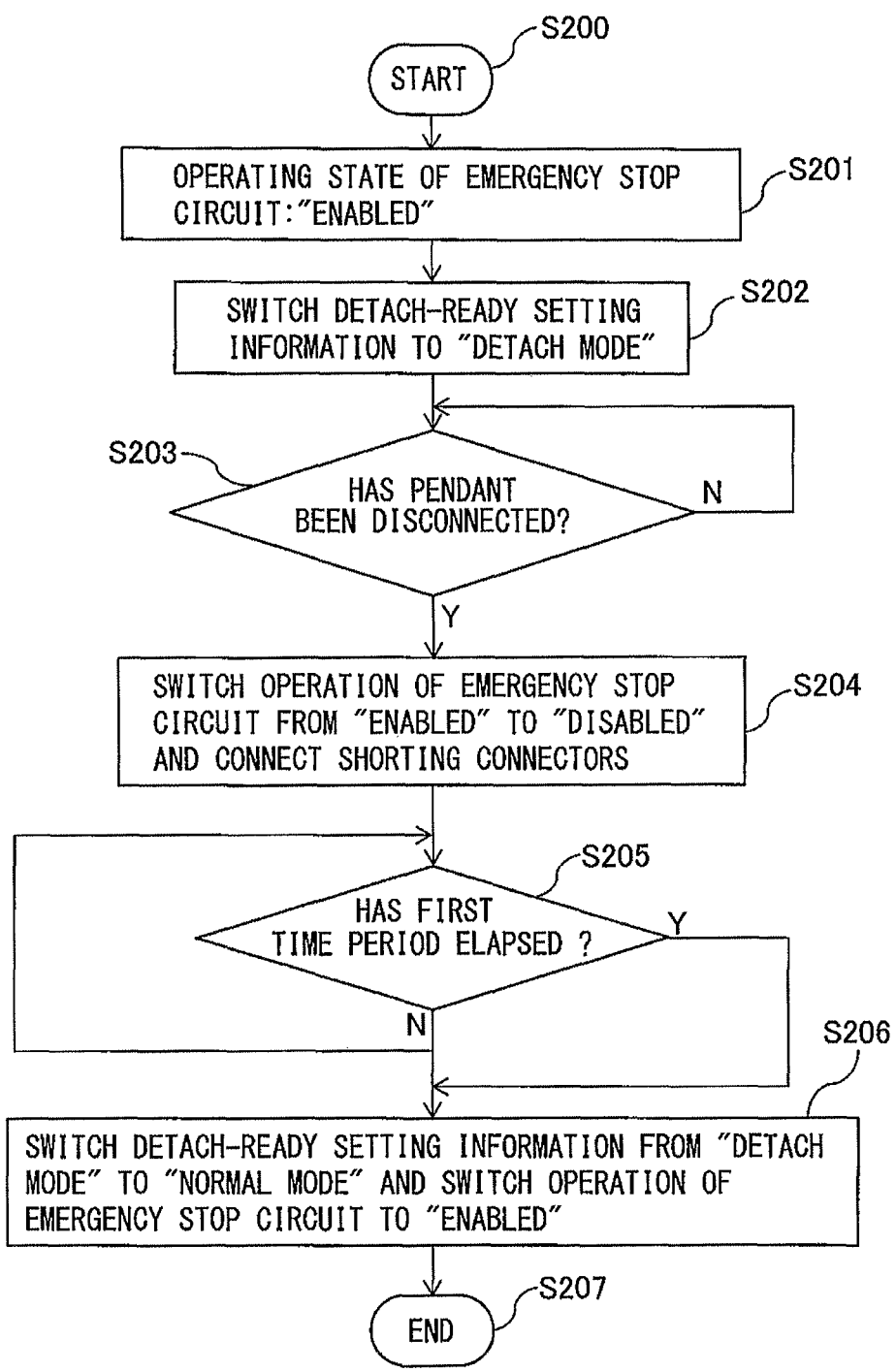
FIG. 5 is a flowchart illustrating the operating procedure of the control apparatus according to the second embodiment of the present invention.

Next, the operating procedure of the control system 200 according to the second embodiment of the present invention will be described with reference to the flowchart of FIG. 5. The process of steps S201 to S203 shows the procedure for disconnecting the pendant 1 from the control apparatus 2. Since this process is the same as the process of steps S101 to S103 described with reference to FIG. 3 in the first embodiment, a detailed description will not be repeated.

In steps S201 to S203, the detach-ready setting switch 23 sets the detach-ready setting information to "detach mode", and the connection state monitoring unit 24 detects that the pendant 1 has been disconnected. Then, in step S204, the operation of the emergency stop circuit 21 is switched from "enabled" to "disabled", and at the same time, the shorting connectors 29a and 29b are connected to the emergency stop circuit 21.

Next, in step S205, it is determined whether the preset first time period has elapsed from the time the operation of the emergency stop circuit 21 was switched from "enabled" to "disabled". If the first time period has not yet elapsed, the process returns to step S205 to continue the time counting.

If it is determined in step S205 that the first time period has elapsed, then in step S206 the detach-ready setting switch 23 is operated to switch the detach-ready setting information from "detach mode" back to "normal mode", and at the same time, the operation of the emergency stop circuit 21 is switched back to "enabled".

With the above arrangement, by disabling the emergency stop circuit 21 only for the duration of the preset first time period, the time period during which the emergency stop switch 11 on the pendant 1 is "disabled" can be limited to ensure safety even when the connection state monitoring unit 24 is faulty. That is, even when the pendant 1 is erroneously detected as being disconnected when actually it is not disconnected, the operation of the emergency stop circuit 21 returns to "enabled" at the end of the first time period, and the emergency stop switch 11 is thus "enabled". Further, by connecting the shorting connectors 29a and 29b while the emergency stop circuit 21 is held in the "disabled" state, an emergency stop can be prevented from occurring when the operation of the emergency stop circuit 21 is switched back to "enabled" which is the normal operating state.

Third Embodiment

Next, a control system according to a third embodiment of the present invention will be described. The control system of the third embodiment has essentially the same configuration as that of the control system 100 of the first embodiment. The control system of the third embodiment differs from the control system 100 of the first embodiment in that when the pendant 1 once disconnected from the control apparatus 2 is connected to the control apparatus 2, the connection state monitoring unit 24 detects the connection of the control apparatus 2 and, in response to the connection of the pendant 1, the control apparatus 2 switches the operation of the emergency stop circuit 21 from "disabled" to "enabled". Otherwise, the configuration is the same as that of the control system of the first embodiment, and therefore, a detailed description will not be given.

With the above arrangement, the pendant 1 can be safely attached to the control apparatus 2, with the power turned on to the control apparatus 2 and with the emergency stop circuit 21 held in the "disabled" state (disarmed state).

Figure 6:
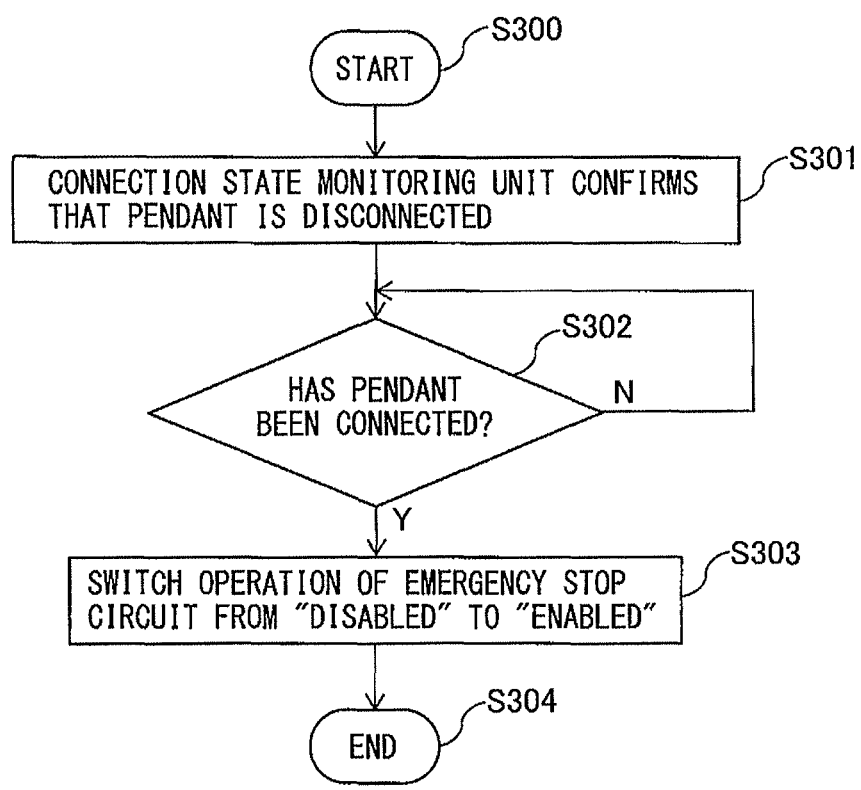
FIG. 6 is a flowchart illustrating the operating procedure of the control apparatus according to a third embodiment of the present invention.

Next, the operating procedure of the control system according to the third embodiment of the present invention will be described with reference to the flowchart of FIG. 6. First, in step S301, the connection state monitoring unit 24 (see FIG. 2) confirms that the pendant 1 is disconnected from the control apparatus 2. At this time, since the pendant 1 is disconnected from the control apparatus 2 and is therefore unable to stop the operation of the driven body even if the emergency stop switch 11 is depressed, the emergency stop circuit 21 is in the "disabled" state.

Next, in step S302, the connection state monitoring unit 24 monitoring the connection state between the pendant 1 and the control apparatus 2 determines whether or not the pendant 1 has been connected to the control apparatus 2. If it is determined by the connection state monitoring unit 24 that the pendant 1 is not connected to the control apparatus 2, the process returns to step S302 to continue to check the connection state.

If it is determined in step S302 that the pendant 1 has been connected to the control apparatus 2, then in step S303 the connection state information is sent from the connection state monitoring unit 24 to the emergency stop circuit 21 via the CPU 20 and, based on the received connection state information, the operation of the emergency stop circuit 21 is switched from "disabled" to "enabled", the software mask applied to the emergency stop signal input from the emergency stop circuit 21 to the CPU 20 is removed.

According to the control system of the third embodiment, the operation of the emergency stop circuit 21 can be switched from "disabled" to "enabled" upon detecting that the pendant 1 has been connected to the control apparatus 2. As a result, when the pendant 1 is connected to the control apparatus 2, the emergency stop switch 11 is immediately operable. That is, if, for example, the operation of the driven body becomes faulty immediately after the pendant 1 is connected to the control apparatus 2, the emergency stop switch 11 can be operated to stop the operation of the driven body, and safety can thus be improved.

Fourth Embodiment

Next, a control system according to a fourth embodiment of the present invention will be described. The control system of the fourth embodiment has essentially the same configuration as that of the control system of the second embodiment. The control system of the fourth embodiment differs from the control system 200 of the second embodiment in that, with the pendant 1 disconnected from the control apparatus 2, the control apparatus 2 switches the operation of the emergency stop circuit 21 from "enabled" to "disabled" for a preset second time period starting from the moment that the detach-ready setting switch 23 is operated to switch the detach-ready setting information to "enabled" and, when the pendant 1 is connected to the control apparatus 2 after the shorting connectors 29a and 29b are disconnected before the second time period elapses, the detach-ready setting switch 23 is operated to switch the detach-ready setting information from "detach mode" to "normal mode, while at the same time, the operation of the emergency stop circuit 21 is switched from "disabled" to "enabled". Otherwise, the configuration is the same as that of the control system of the first embodiment, and therefore, a detailed description will not be given.

When the connection state monitoring unit 24 is faulty, the pendant 1 may be erroneously detected as being not connected when actually it is connected; in such cases, the emergency stop switch 11 on the pendant 1 is "disabled". According to the control system of the fourth embodiment, by "disabling" the emergency stop circuit 21 only for the duration of the second time period, the time period during which the emergency stop circuit 21 is "disabled" can be limited to ensure safety. Further, when the pendant 1 is connected to the control apparatus 2 during the "disabled" time period, the detach-ready setting information is switched from "detach mode" to "normal mode", and thus the operation of the emergency stop circuit 21 can be switched to "enabled" even before the second time period elapses.

Figure 7:
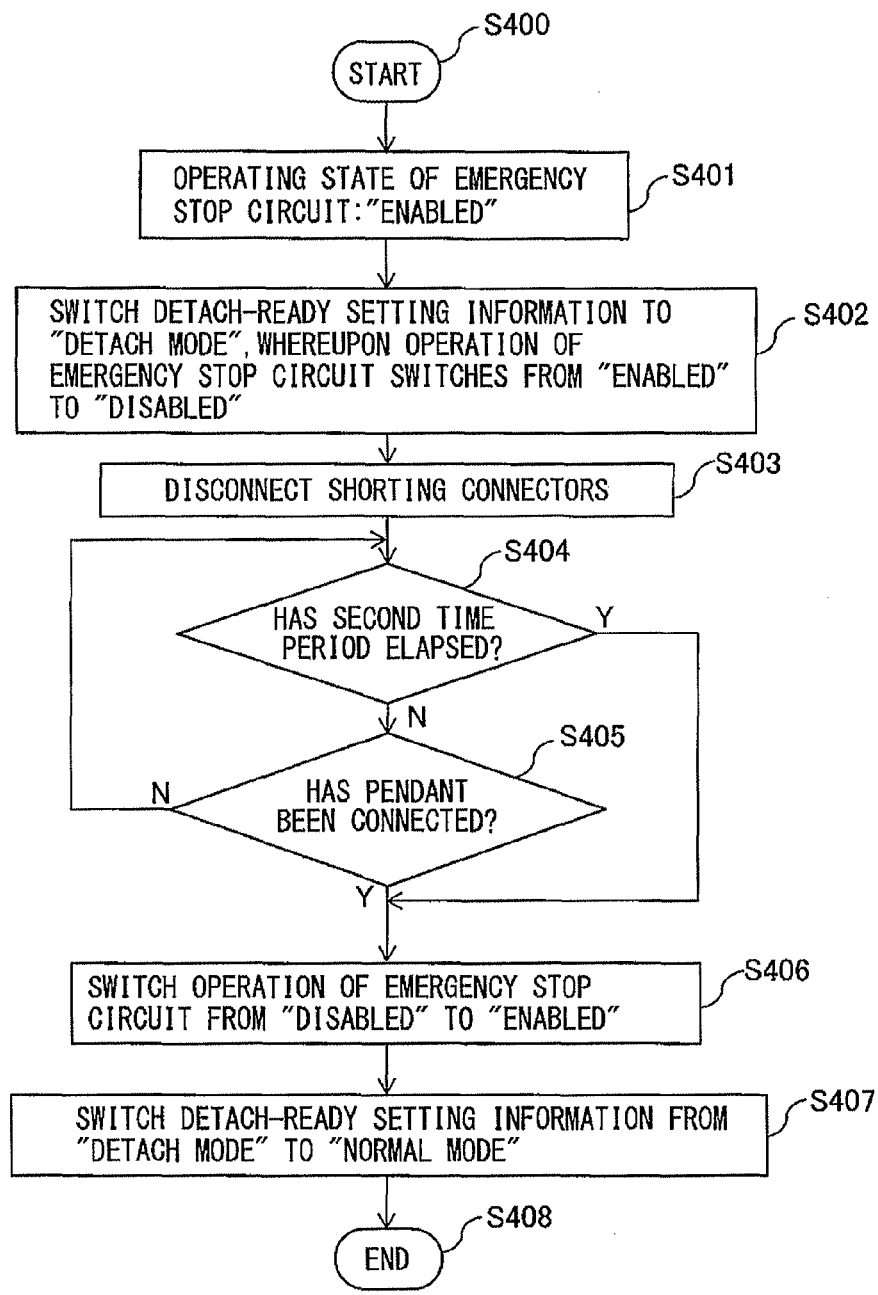
FIG. 7 is a flowchart illustrating the operating procedure of the control apparatus according to a fourth embodiment of the present invention.

Next, the operating procedure of the control apparatus according to the fourth embodiment of the present invention will be described with reference to the flowchart of FIG. 7. First, in step S401, the operation of the emergency stop circuit 21 is "enabled". The pendant 1 remains disconnected from the control apparatus 2, and the shorting connectors 29a and 29b are connected to the port 26 on the control apparatus 2 (see FIG. 4).

Next, in step S402, the detach-ready setting information is switched from "normal mode" to "detach mode" by using the detach-ready setting switch 23, whereupon the operation of the emergency stop circuit 21 switches from "enabled" to "disabled".

In step S403, the shorting connectors 29a and 29b are disconnected.

Next, in step S404, the time period elapsed from the moment the detach-ready setting information was switched to "detach mode" is counted to determine whether the preset second time period has elapsed or not.

If it is determined in step S404 that the second time period has not yet elapsed, the process proceeds to step S405 to determine whether or not the pendant 1 is connected to the control apparatus 2. If it is determined that the pendant 1 is not connected to the control apparatus 2, the process returns to step S404 to continue the time counting.

If it is determined in step S404 that the second time period has elapsed, the process proceeds to step S406 where the operation of the emergency stop circuit 21 is switched from "disabled" to "enabled". That is, the period during which the emergency stop circuit 21 is "disabled" is limited to the period that lasts until the end of the second time period. Further, in step S407, the detach-ready setting information is switched from "detach mode" to "normal mode".

On the other hand, if it is determined in step S405 that the pendant 1 is connected to the control apparatus 2, then in step S406 the operation of the emergency stop circuit 21 is switched from "disabled" to "enabled", regardless of whether the second time period has elapsed or not, and in step S407, the detach-ready setting information is switched from "detach mode" to "normal mode".

As described above, according to the control system of the fourth embodiment, when connecting the once disconnected pendant 1 to the control apparatus 2, the period during which the operation of the emergency stop circuit 21 is "disabled" is limited to the preset period and, even within the preset period, if the pendant 1 is connected to the control apparatus 2, the operation of the emergency stop circuit 21 can be "enabled"

upon detecting the connection; in this way, the pendant can be safely connected to the control apparatus.

Fifth Embodiment

Figure 8:
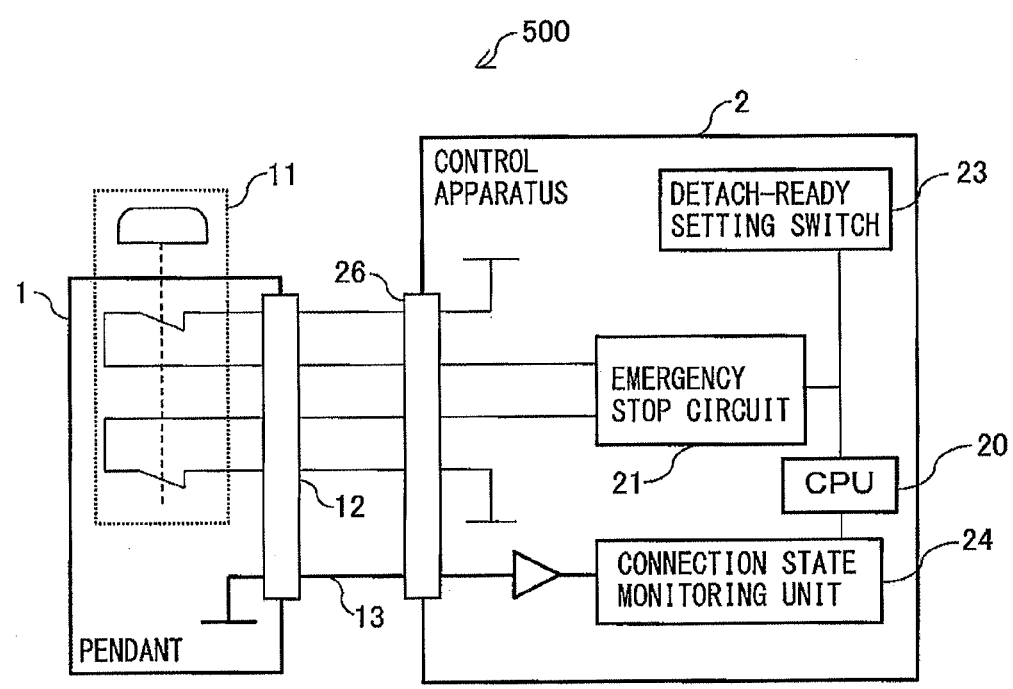
FIG. 8 is a diagram showing the configuration of a control system according to a fifth embodiment of the present invention.

Next, a control system according to a fifth embodiment of the present invention will be described. FIG. 8 is a diagram showing the configuration of the control system according to the fifth embodiment. The control system 500 of the fifth embodiment differs from the control system 100 of the first embodiment in that the connection state monitoring unit 24 judges the connection condition between the pendant 1 and the control apparatus 2 based on a state signal. Otherwise, the configuration is the same as that of the control system 100 of the first embodiment, and therefore, a detailed description will not be given.

The state signal is sent from the pendant 1 to the control apparatus 2 via a state signal connector 13 connecting between the pendant 1 and the control apparatus 2. Examples of the state signal include information that indicates the operating condition of the pendant 1.

According to the control system 500 of the fifth embodiment, since the connection state monitoring unit 24 judges the connection condition between the pendant 1 and the control apparatus 2 based on the state signal, the connection state between the pendant 1 and the control apparatus 2 can be accurately identified.

Sixth Embodiment

Figure 9:
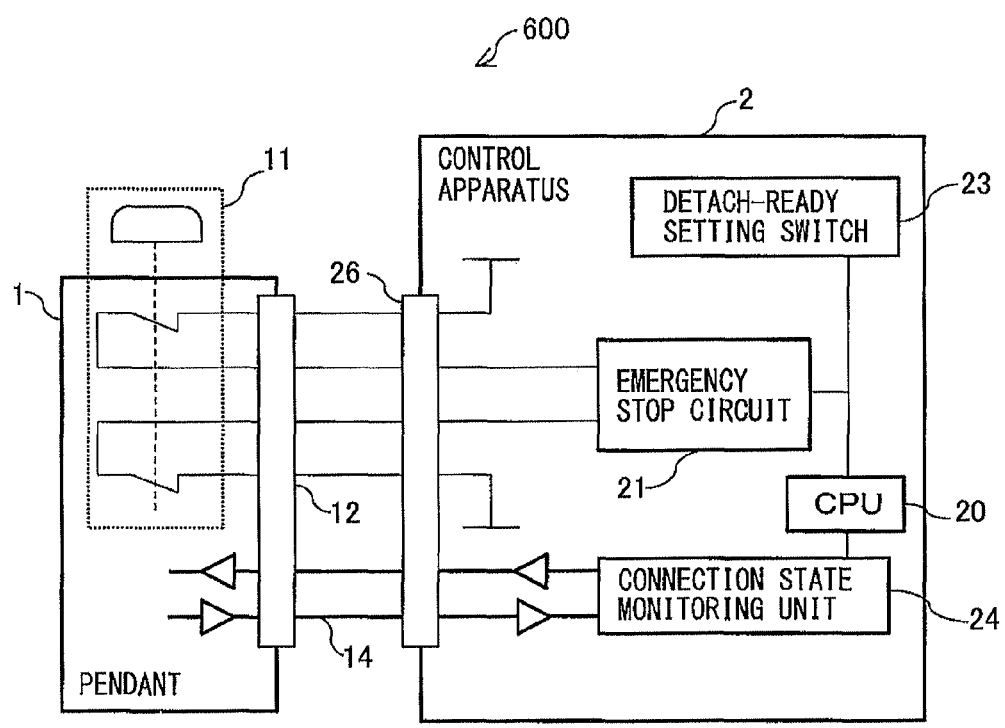
FIG. 9 is a diagram showing the configuration of a control system according to a sixth embodiment of the present invention.

Next, a control system according to a sixth embodiment of the present invention will be described. FIG. 9 is a diagram showing the configuration of the control system according to the sixth embodiment. The control system 600 of the sixth embodiment differs from the control system 100 of the first embodiment in that the connection state monitoring unit 24 determines whether the pendant 1 is connected to or disconnected from the control apparatus 2 by monitoring communication between the pendant 1 and the control apparatus 2. Otherwise, the configuration is the same as that of the control system 100 of the first embodiment, and therefore, a detailed description will not be given.

The communication between the pendant 1 and the control apparatus 2 is carried out via a communication line 14 connecting between the pendant 1 and the control apparatus 2. The communication between the pendant 1 and the control apparatus 2 is bidirectional, and the connection state between the pendant 1 and the control apparatus 2 can be checked by sending a signal from the control apparatus 2 to the pendant 1 and receiving a response signal from the pendant 1.

According to the system 600 of the sixth embodiment, since the connection state monitoring unit 24 determines whether the pendant 1 is connected to or disconnected from the control apparatus 2 by monitoring communication between the pendant 1 and the control apparatus 2, the connection state between the pendant 1 and the control apparatus 2 can be accurately identified.

Furthermore, since the disconnection of the pendant 1 is determined by monitoring communication between the pendant 1 and the control apparatus 2, the emergency stop switch 11 can be held in the "enabled" state until the pendant 1 is disconnected. With this arrangement, it is possible to avoid a situation where the emergency stop switch 11 is "disabled" when the pendant 1 remains connected.

Seventh Embodiment

Figure 10:
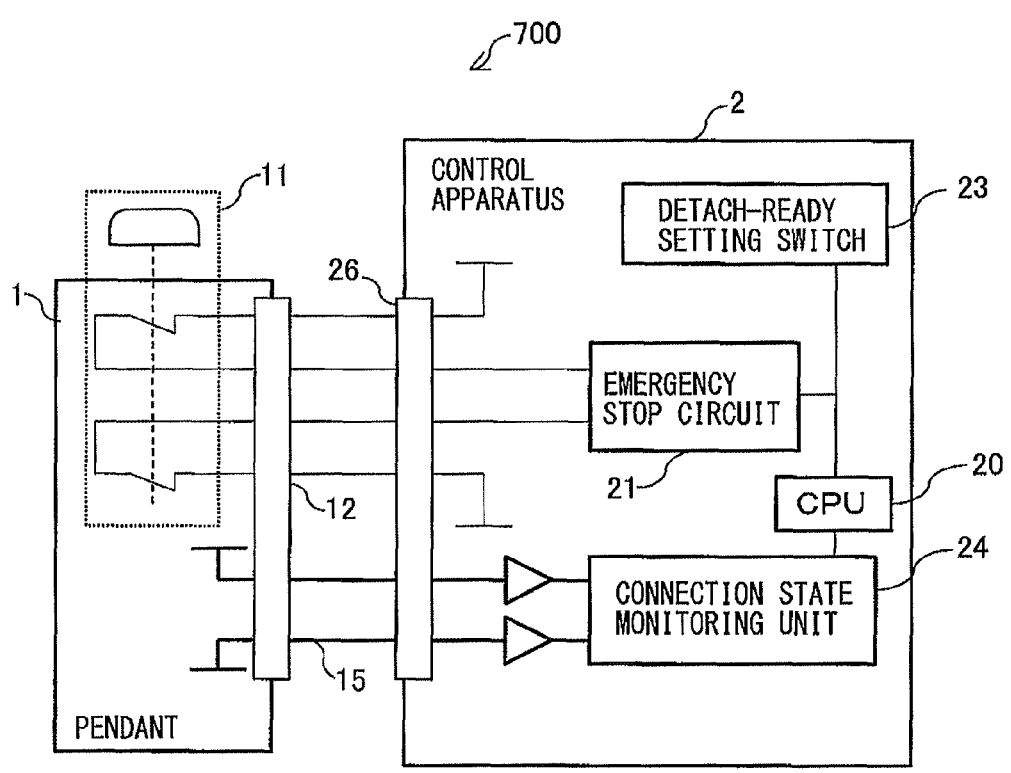
FIG. 10 is a diagram showing the configuration of a control system according to a seventh embodiment of the present invention.

Next, a control system according to a seventh embodiment of the present invention will be described. FIG. 10 is a diagram showing the configuration of the control system according to the seventh embodiment. The control system 700 of the seventh embodiment differs from the control system 100 of the first embodiment in that the connection state monitoring unit 24 judges the connection state between the pendant 1 and the control apparatus 2 by using duplicated state signals. Otherwise, the configuration is the same as that of the control system 100 of the first embodiment, and therefore, a detailed description will not be given.

The state signals are sent from the pendant 1 to the control apparatus 2 via duplicated state signal connectors 15 connecting between the pendant 1 and the control apparatus 2. Examples of the state signals include information that indicates the operating condition of the pendant 1.

According to the control system 700 of the seventh embodiment, since the connection state monitoring unit 24 judges the connection state between the pendant 1 and the control apparatus 2 by using the duplicated state signals, the connection state between the pendant 1 and the control apparatus 2 can be judged with higher accuracy than when the connection state between the pendant 1 and the control apparatus 2 is judged based on a single state signal. The embodiment is not limited to duplicating the state signal, but the state signal may be triplicated or more. By duplicating, etc., the state signal, as in the control system of the seventh embodiment, the occurrence of an erroneous operation due to a single failure can be prevented.

Eighth Embodiment

Figure 11:
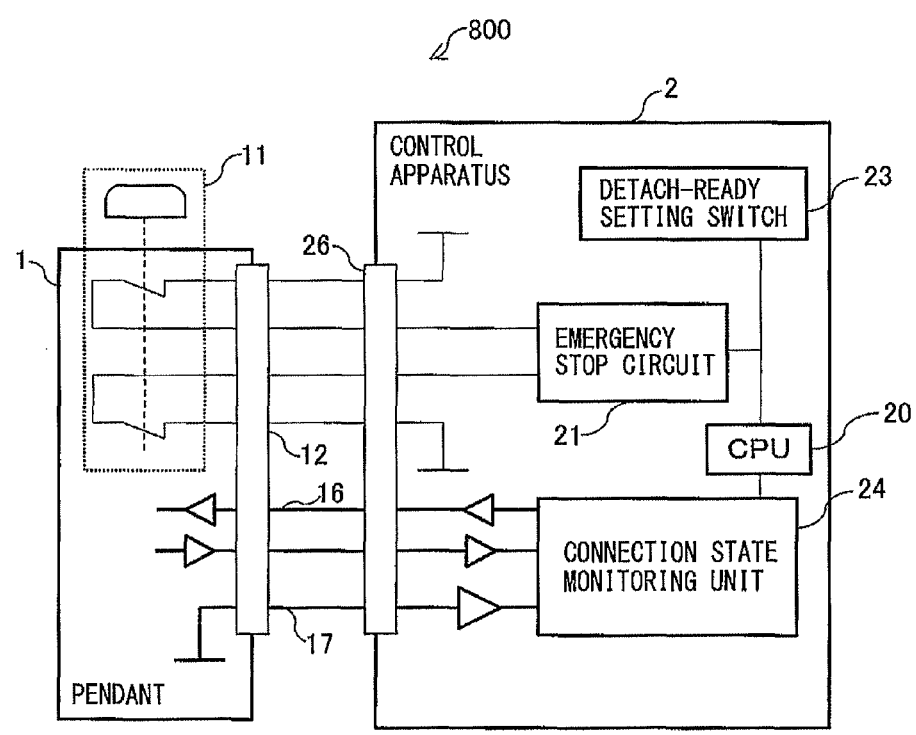
FIG. 11 is a diagram showing the configuration of a control system according to an eighth embodiment of the present invention.

Next, a control system according to an eighth embodiment of the present invention will be described. FIG. 11 is a diagram showing the configuration of the control system according to the eighth embodiment. The control system 800 of the eighth embodiment differs from the control system 100 of the first embodiment in that the connection state monitoring unit 24 monitors the state signal as well as the communication between the pendant and the control apparatus. Otherwise, the configuration is the same as that of the control system 100 of the first embodiment, and therefore, a detailed description will not be given.

The state signal in the eighth embodiment is the same as the state signal used in the fifth embodiment, and is transmitted from the pendant 1 to the control apparatus 2 via a state signal connector 17. The communication between the pendant 1 and the control apparatus 2 can be carried out via a communication line 16 in the same manner as the control system 600 of the sixth embodiment.

According to the control system 800 of the eighth embodiment, since the connection state monitoring unit 24 monitors the state signal as well as the communication between the pendant 1 and the control apparatus 2, the connection state between the pendant 1 and the control apparatus 2 can be identified with higher accuracy than when the connection state between the pendant 1 and the control apparatus 2 is judged based only on the state signal or on the communication, and the occurrence of an erroneous operation due to a single failure can be prevented.

Ninth Embodiment

Figure 12:
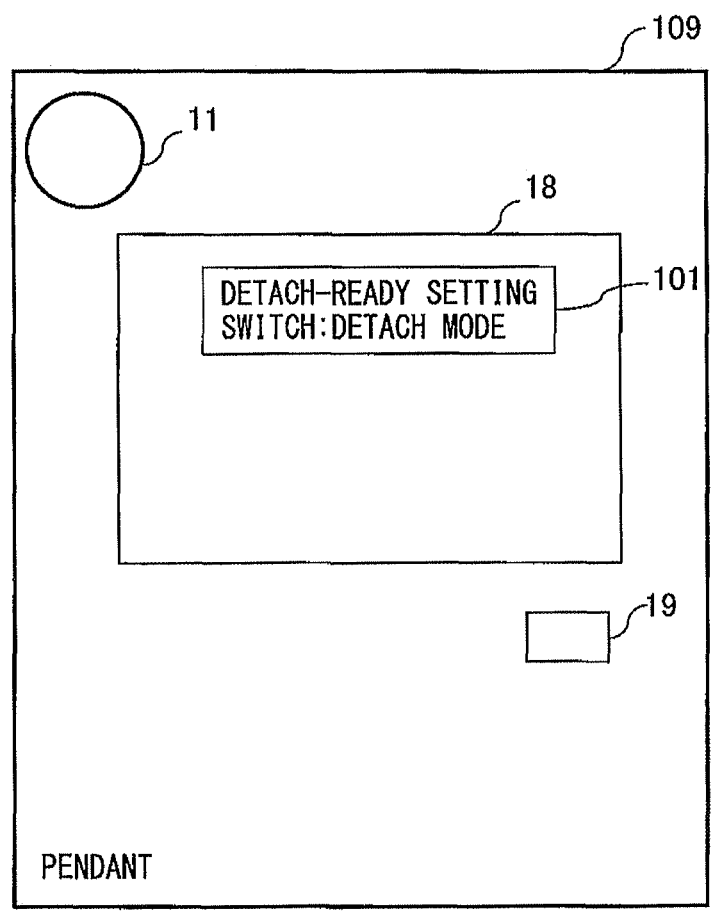
FIG. 12 is a diagram showing the configuration of a pendant in a control system according to a ninth embodiment of the present invention.

Next, a control system according to a ninth embodiment of the present invention will be described. FIG. 12 is a diagram showing the configuration of a pendant 109 in the control system according to the ninth embodiment. The pendant 109 in the control system of the ninth embodiment differs from the pendant 1 in the control system of the first embodiment by the inclusion of a unit for displaying which detach-ready setting information, "detach mode" or "normal mode", is selected by the detach-ready setting switch 23. Otherwise, the configuration is the same as that of the pendant 1 in the control system of the first embodiment, and therefore, a detailed description will not be given.

As shown in FIG. 12, the pendant 109 includes a display 18 in addition to the emergency stop switch 11, and may further include an operation indicator 19. The display 18 can display which detach-ready setting information, "detach mode" or "normal mode", is selected by the detach-ready setting switch 23. For example, the display 18 can produce a display "DETACH-READY SETTING SWITCH: DETACH MODE" in a designated region 101 on the display screen. A liquid crystal display or an organic EL display device or the like can be used as the display 18. However, the display 18 is not limited to this particular type of display device. The operation indicator 19 turns on when "detach mode" is selected by the detach-ready setting switch 23 and turns off when "normal mode" is selected, or the on/off operation may be reversed. An LED can be used as the operation indicator 19, or some other suitable light-emitting device may be used.

According to the pendant 109 in the control system of the ninth embodiment, a display can be produced to indicate which mode, "detach mode" or "normal mode", is selected by the detach-ready setting switch 23 and, by confirming the display indicating "detach mode", the pendant 109 can be securely detached without putting the apparatus in an emergency stop condition.

Tenth Embodiment

Figure 13:
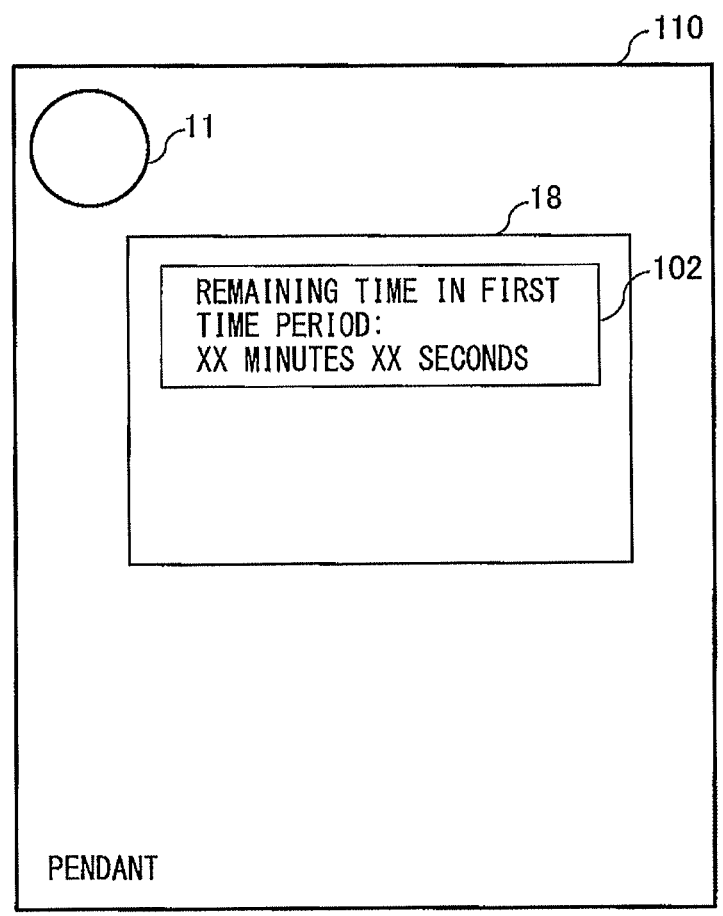
FIG. 13 is a diagram showing the configuration of a pendant in a control system according to a tenth embodiment of the present invention.

Next, a control system according to a tenth embodiment of the present invention will be described. FIG. 13 is a diagram showing the configuration of a pendant 110 in the control system according to the tenth embodiment. The pendant 110 in the control system of the tenth embodiment differs from the pendant 1 in the control system of the first embodiment by the inclusion of a unit for displaying the amount of time remaining in a preset time period. Otherwise, the configuration is the same as that of the pendant 1 in the control system of the first embodiment, and therefore, a detailed description will not be given.

As shown in FIG. 13, the pendant 110 includes a display 18 in addition to the emergency stop switch 11. The display 18 can display the amount of time remaining in a preset time period. For example, the display 18 can produce a display "REMAINING TIME IN FIRST TIME PERIOD: XX MINUTES XX SECONDS" in a designated region 102 on the display screen. The display 18 is the same as that used in the ninth embodiment, and will not be described in detail.

According to the pendant 110 in the control system of the tenth embodiment, since the amount of time remaining until the emergency stop circuit 21 is "disabled" can be displayed, the time period during which the emergency stop circuit 21 is made inoperative can be accurately identified, and thus the pendant 110 can be safely attached to the control apparatus 2.

What is claimed is:
1. A control system comprising a control apparatus for controlling a driven body, and a pendant having an emergency stop switch for causing operation of said driven body to stop, wherein said control apparatus includes:
an emergency stop circuit which causes operation of said driven body to stop when said emergency stop switch is operated or when said pendant is disconnected from said control apparatus;
a detach-ready setting switch which switches detach-ready setting information to "detach mode" or "normal mode", said detach-ready setting information being switched to "detach mode" when connecting or disconnecting said pendant to or from said control apparatus and otherwise switched to "normal mode"; and
a connection state monitoring unit which monitors connection state between said pendant and said control apparatus, and wherein
said control apparatus disables operation of said emergency stop circuit when said detach-ready setting information is set to "detach mode" and when said connection state information indicates that said pendant has been disconnected from said control apparatus.

2. The control system according to claim 1, further comprising a shorting connector which is detachable with respect to said control apparatus and which short-circuits and thereby disables said emergency stop circuit, and wherein
after said detach-ready setting information has been set to "detach mode" by said detach-ready setting switch, if it is detected by said connection state monitoring unit that said pendant has been disconnected, said control apparatus switches the operation of said emergency stop circuit from "enabled" to "disabled" for a preset first time period, and connects said shorting connector to said emergency stop circuit, and
when said first time period has elapsed, said detach-ready setting information is switched from "detach mode" to "normal mode" by said detach-ready setting switch, while at the same time, the operation of said emergency stop circuit is switched from "disabled" to "enabled".

3. The control system according to claim 1, wherein when said pendant once disconnected from said control apparatus is connected to said control apparatus, said connection state monitoring unit detects the connection of said pendant, and
in response to the connection of said pendant, said control apparatus switches the operation of said emergency stop circuit from "disabled" to "enabled".

4. The control system according to claim 2, wherein with said pendant disconnected from said control apparatus, and with said shorting connector detached, said control apparatus sets said detach-ready setting switch to switch said detach-ready setting information to "detach mode" for a preset second time period and switches the operation of said emergency stop circuit from "enabled" to "disabled", and
when said pendant is connected to said control apparatus before said second time period elapses, said detach-ready setting switch is set to switch said detach-ready setting information from "detach mode" to "normal mode, while at the same time, the operation of said emergency stop circuit is switched from "disabled" to "enabled".

5. The control system according to claim 1, wherein said connection state monitoring unit judges the connection state between said pendant and said control apparatus based on a state signal.

6. The control system according to claim 1, wherein said connection state monitoring unit determines whether said pendant is connected to or disconnected from said control apparatus by monitoring communication between said pendant and said control apparatus.

7. The control system according to claim 1, wherein said connection state monitoring unit judges the connection state between said pendant and said control apparatus by using duplicated state signals.

8. The control system according to claim 1, wherein said connection state monitoring unit monitors a state signal as well as communication between said pendant and said control apparatus.

9. The control system according to claim 1, wherein said detach-ready setting switch is operated not only to switch said detach-ready setting information from "normal mode" to "detach mode" but also to switch said detach-ready setting information from "detach mode" to "normal mode".

10. The control system according to claim 1, further comprising a unit for displaying which detach-ready setting information, "detach mode" or "normal mode", is selected by said detach-ready setting switch.

11. The control system according to claim 1, wherein said detach-ready setting switch can be operated by operating a key on said pendant or by operating a touch panel, a setup screen, or a switch located on or near said control apparatus.

12. The control system according to claim 1, wherein said pendant includes a unit for displaying the amount of time remaining in a preset time period.

* * * * *